June 3, 1958  R. C. MACKEY  2,837,712
MICROWAVE MEASUREMENT APPARATUS
Filed Nov. 14, 1955  2 Sheets-Sheet 1

INVENTOR.
RICHARD C. MACKEY
BY
ATTORNEYS

INVENTOR.
RICHARD C. MACKEY
BY
ATTORNEYS

United States Patent Office 2,837,712
Patented June 3, 1958

2,837,712

MICROWAVE MEASUREMENT APPARATUS

Richard C. Mackey, Beverly Hills, Calif., assignor to The Regents of the University of California, Berkeley, Calif., a corporation of California Application November 14, 1955, Serial No. 546,508

9 Claims. (Cl. 324—.5)

This invention relates to techniques for comparing accurately frequencies which differ by large ratios; i. e., by ratios exceeding two orders of magnitude. It may be considered as relating to techniques for frequency multiplication or division by such large ratios to permit, for example, the measurement or control of microwave frequencies by stepping them down to lower values, where instrumentation is simpler and measurement or control more readily accomplished.

Among the objects of the present invention are to provide means and methods for stepping down frequencies in the microwave range, where counting techniques and other methods of frequency division conventional in lower frequency bands are inapplicable; to provide means and methods of obtaining very large frequency divisions in a single step; to provide a direct reading frequency meter which is directly applicable to frequencies in the microwave range; and to provide means of adapting frequency measurement apparatus designed for use in more moderate frequency ranges to the measurement of frequencies two to three orders of magnitude greater.

The phenomenon of gyromagnetic resonance in paramagnetic substances is now well known. When such substances are subjected to a polarizing magnetic field they develop magnetic moments which, in accordance with accepted theories, are associated with spins of constituent particles of the atoms of which the substances are composed, those substances which exhibit the paramagnetic qualities being those which contain particles having spins in one direction which are not counterbalanced by equal and opposite spins. With the magnetic moment which these substances develop when alined with a polarizing field there is associated an angular momentum which causes the particles to precess around a new equilibrium position when the direction of the field is suddenly changed, the frequency of the precession being a linear function of the intensity of the field. The precession results in the generation of an electromagnetic wave at the precession frequency. Conversely, when these materials are in a magnetic field and are coupled in a system which is excited at the frequency of precession they will absorb energy from the system.

The resonances exhibited in this fashion by some paramagnetic materials are very sharp. The variation of absorption or emission with frequency, in a constant field, or with magnetization at constant frequency, has substantially the form of the familiar resonance curve exhibited by macroscopic resonance systems. The frequencies absorbed or emitted are referred to as "absorption lines" or "emission lines"; since the frequencies are identical the term "absorption lines" will be used throughout this specification.

The mid-frequency of the gyromagnetic resonance curve in a polarizing field of given intensity depends upon the nature of the particle with which the spin is associated. If paramagnetism results from unbalanced electron spins, the center frequency of the resonant line is defined by the equation $$f_e = \frac{g_e \left(\frac{e}{m}\right) H}{4\pi c} = kH$$

where $g_e$ is the gyromagnetic constant of the material, $e/m$ is the ratio of charge to mass of the electron, H is the intensity of the polarizing field in gausses, c is the speed of light, and k the gyromagnetic ratio, cycles per gauss. The theoretical value of $g_e$ for free electrons is 2. In certain organic materials having a large concentration of relatively free electrons the gyromagnetic constant of the electrons is modified by the environment; one such compound is diphenyl-picryl-hydrazyl, wherein the electronic gyromagnetic constant $g_e$ equals 2.0036. Another material having a large free electron concentration is tris-p-nitro-phenyl-methyl. Tables are published giving the gyromagnetic constants of this and other materials having similar properties.

Other materials owe their paramagnetic qualities to spins associated with the nucleus of the atom. In this case the center frequency of the absorption line is given by the equation $$f_n = \frac{G_n \left(\frac{e}{M}\right) H}{4\pi c} = HK$$

where $G_n$ is the gyromagnetic constant of the nucleus, M is its mass, and K is the nuclear gyromagnetic ratio. For the present purposes a particularly valuable absorption line is due to hydrogen, wherein the nucleus comprises a single protron; for convenience the protron resonance frequency will be referred to as $f_p$ and its gyromagnetic constant as $g_p$. As in the case of electronic resonance the gyromagnetic constant of the nucleus varies slightly, depending upon its environment, and published tables give the values of the resonance lines for different materials. Thus for the protron resonance as displayed by the hydrogen nucleus in water the tables give a value for K of 4257.76 cycles per gauss, whereas the value of K displayed by the hydrogen atom in mineral oil is 4259.85 cycles per gauss. This compares with a value of $k=2805.7$ kilocycles per gauss, which defines the resonance frequency of electrons in the hydrazyl compound mentioned above.

For any two compounds, one of which exhibits an electronic absorption line and the other of which exhibits a nuclear absorption line there is a fixed ratio of frequencies representing the center frequencies of the lines when the two materials are subjected to the same magnetic field. Thus if the two materials are water and hydrazyl the ratio $k/K$ is 658.966. If the two materials are mineral oil and hydrazyl the ratio $k/K$ is 658.658. Other nuclei, such as deuterium, lithium, etc., will give higher ratios of $k/K$.

In accordance with the present invention a varying magnetic field is established having an average value which is approximately that required to produce an electronic gyromagnetic resonance in a sample of one material and which varies cyclically through a range which is preferably quite narrow in comparison with the average value of the field. Two samples of materials are introduced into this field, one of which exhibits an electronic gyromagnetic resonance line and the other a nuclear gyromagnetic resonance line, the materials being such that the ratio of the gyromagnetic ratios $k/K$ is known. As the magnetic field varies one sample will pass through resonance at a higher frequency, usually in the microwave range, at the instant when the other sample resonates to a much lower frequency, in the range of frequency to be compared. Either frequency may be considered as standard, but usually it will be the lower of the two frequencies which serves this function. If the higher frequency does not bear the exact desired ratio to the standard frequency, resonance will occur at different epochs of the cycle of variation of the magnetic field. The relative epochs of resonance with respect to the cycle of variation are compared, and one or the other of the frequencies is varied until both occur at the same epoch of the variation of the magnetic field, at which time it is known that the two frequencies differ by the ratio of the cycles-per-gauss of their respective resonance lines.

As a more concrete example of the utility of the invention, the higher frequency may be that of a microwave oscillator and the lower frequency may be that of a wave meter operating in the lower range, which may be referred to as a "standard" since it is known although it can be varied. In this case it will be the wave meter whose frequency is varied until coincidence occurs. On the other hand, it can be the lower frequency which is constant and the higher frequency can be varied to bring it to an exact value.

The invention will be more clearly understood from a description of its application to a wave meter which follows, this description being illustrated by the accompanying drawings, wherein.

Figure 1:
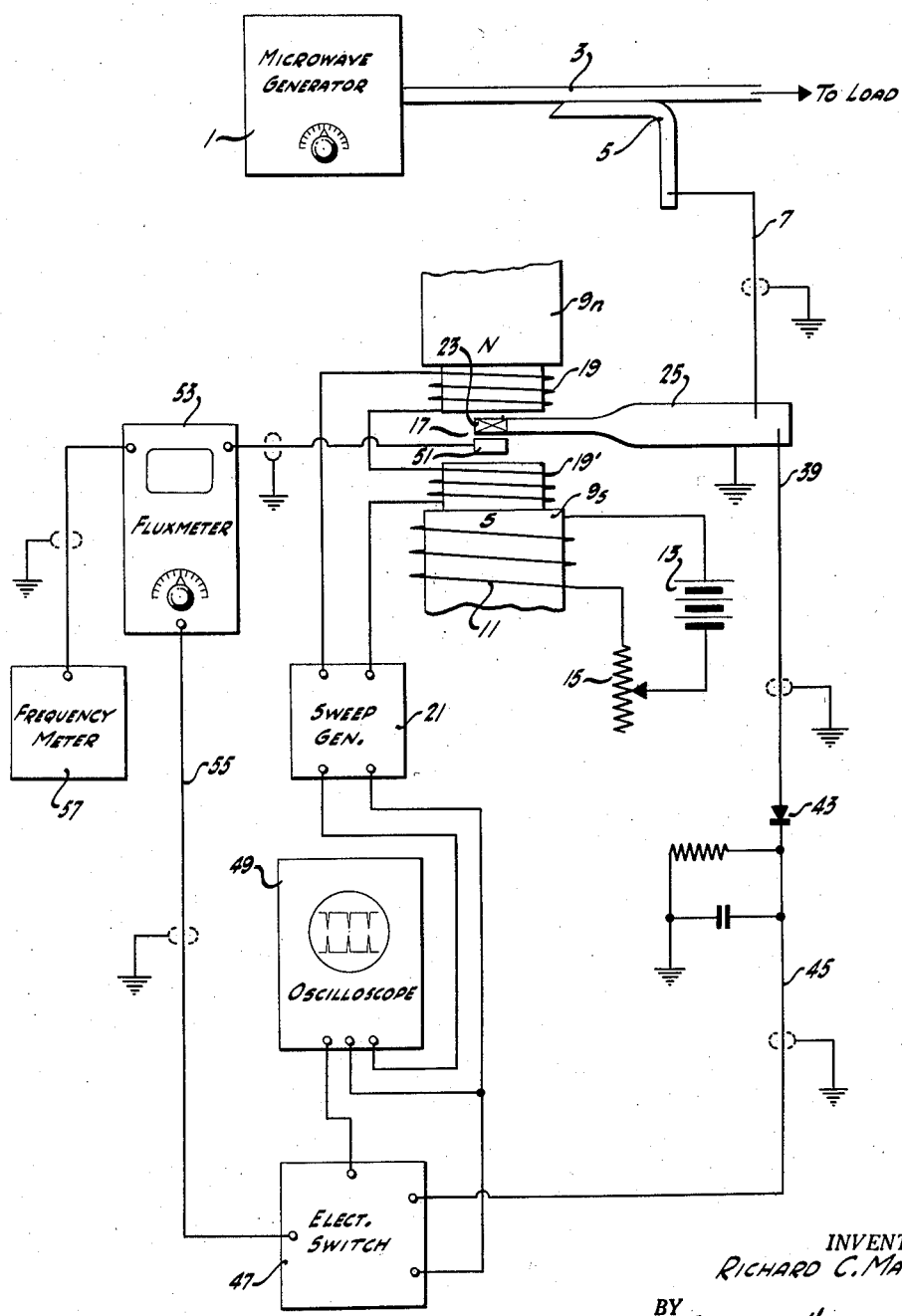
Fig. 1 is a diagram, partly schematic and partly in block form, of a wave meter embodying the present invention.

In the drawing of Fig. 1 the microwave generator which is the source of frequencies to be measured or controlled is indicated by the reference character 1. The source may, for example, be a klystron or magnetron. It feeds a useful load through a wave guide 3. A small portion of this load, to be used for measurement or control, is taken off through a directional coupler 5 which feeds the equipment with which this invention is immediately concerned through a coaxial line 7.

For the frequency comparison apparatus there is provided a magnet whereof only the pole pieces $9_n$ and $9_s$ are shown, the yoke connecting these pole pieces being omitted for the sake of simplicity in the drawings. The primary excitation of the magnet is indicated as being a winding 11 which connects to a direct current source 13, rheostat 15 being provided for adjusting the intensity of the flux in the air gap 17, formed between the pole pieces of the magnet. This arrangement is illustrative of several that may be used: e. g., a permanent magnet may be employed with a variable magnetic shunt to vary the flux in the gap.

Cyclic variation of the intensity of the field in the air gap is provided by a pair of coils 19, 19', mounted on the pole pieces. These coils are excited by sweep generator 21. The sweep generator can develop either a sawtooth or a sinusoidal waveform. It operates, preferably, at a relatively low frequency, somewhere in the range of 300 or 400 cycles being convenient, although either lower or higher frequencies can be used.

The two samples of gyromagnetic material of different gyromagnetic ratios are mounted as nearly centrally as possible within the air gap 17 of the magnet. The electronic sample 23, of the hydrazyl compound above identified or other material having similar electronic gyromagnetic constant, is mounted in the end of a cavity resonator 25.

Figure 2:
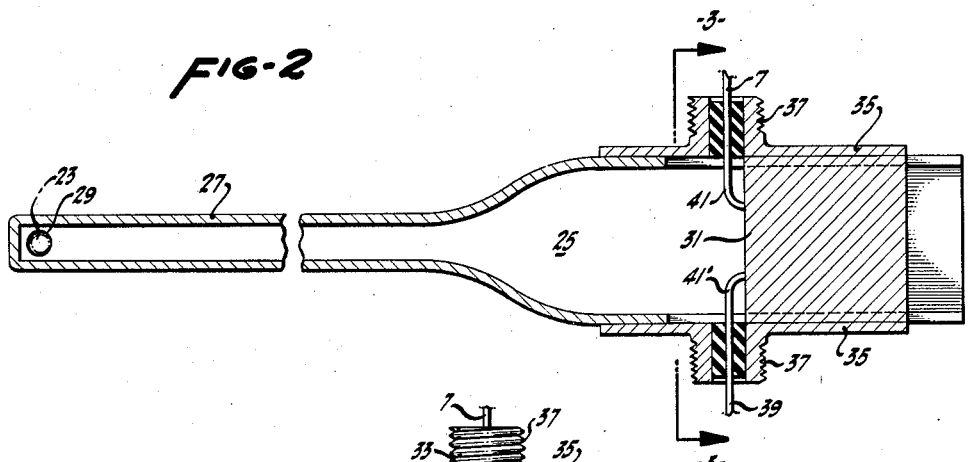
Fig. 2 is a longitudinal cross-sectional view of a coupler used for introducing a sample of a material having an electronic gyromagnetic constant into the varying magnetic field, the plane of the section being longitudinal of a resonant section of wave guide forming the coupler.
Figure 3:
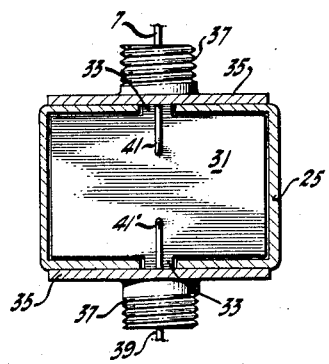
Fig. 3 is a transverse section through the coupler illustrated in Fig. 2, the plane of section being indicated by the broken line 3—3 of Fig. 2.

This cavity resonator is shown in more detail in Figs. 2 and 3. The resonator itself is essentially a tapered wave guide adapted to propagate oscillations within the frequency range for which the device is intended, shorted at both ends. Both the input and the output of the resonator are at the right as shown in Fig. 2, in the portion where it is of full standard size for the frequencies involved. From this point toward the left of the figure the small dimension or "height" of the guide is tapered down to perhaps one-fourth of its maximum dimension, to form a sampling-probe section 27. Closely adjacent to the closed end of this section there is provided a small hole 29 in which a sample 30 of the gyromagnetic material to be used may be inserted, usually in a small glass capsule, as shown by the dotted outline, the sample being replaceable.

The larger end of the resonator is provided with two longitudinal slots centered in the broader face of the guide. This end of the resonator is closed by a movable tuning plug 31, which fits closely within the wave-guide section and is provided with ridges 33 extending through the slots. A pair of cover plates 35 are sweated or otherwise secured to these ridges and mounted on the cover plates are connectors 37 for attaching coaxial conductors 7 and 39, respectively. These conductors terminate in coupling loops 41, 41', respectively. Both conductors 7 and 39 are flexible, and therefore it can be seen that the cavity can be tuned by sliding the plug 31, the conductors passing through the slots, which are covered by the plates 33 and 35 when the plug is withdrawn toward the right of the figure. It may be noted that this resonator can be operated in accordance with many modes; it is not necessary that the distance between the closed ends be a single half wavelength, it can be several. This construction enables the sample to be inserted in the center of the varying magnetic field even though very short wavelengths may be employed.

Lead 39 connects to a crystal detector circuit 43 of conventional type, and from the detector a lead 45 connects either through an electronic switch 47 to an oscilloscope 49 or, if a double-beam oscilloscope is available, directly to one of the deflection circuits thereof, preferably, although not necessarily, one of the vertical deflection circuits.

The sample of material having a nuclear gyromagnetic resonance is contained in the probe 51 of what may be a commercial, gyromagnetic-type fluxmeter or magnetometer 53. This meter may be of either the Pound type or the Varian-Bloch type; where the Pound type of meter is used the sample in the probe 51 is coupled to the tank circuit of a weakly oscillating oscillator. When the sample is in gyromagnetic resonance with the frequency of the oscillator the sample absorbs energy to produce a pulse of downward modulation in its output. This pulse is detected and amplified within the meter and is supplied through a lead 55 to either the electronic switch 47 or to the second vertical deflecting circuit of a dual beam oscilloscope.

If the Varian-Bloch type of fluxmeter is used, resonance of the sample is indicated by the generation of a gyromagnetic pulse at the frequency to which the resonant circuit of the meter is tuned. This produces a positively modulated pulse, which is fed through lead 55 to the oscilloscope in the same manner as the pulse of negative modulation with the other type of meter. There is also shown, connected to the meter, an auxiliary frequency meter 57, which may or may not be necessary, depending upon the type of fluxmeter used.

The horizontal sweep circuit of the oscilloscope 49 is driven by the same sweep generator 21 that excites the coils 19 of the magnet to develop the varying component of the magnetic field within which the samples are located. It is advantageous to synchronize the oscilloscope on a sub-multiple of the frequency developed by the sweep generator. It must, of course, be synchronized on either the sweep frequency itself or on a sub-multiple of that frequency, where a single-beam scope is used with the electronic switch 47. The electronic switch is also synchronized with either the sweep generator frequency or the same sub-multiple thereof as the oscilloscope, so that the pulses developed from the two samples are displayed in alternate traces. Such use of an electronic switch to produce multiple traces is conventional, and therefore the arrangement is not shown in detail.

Figure 4:
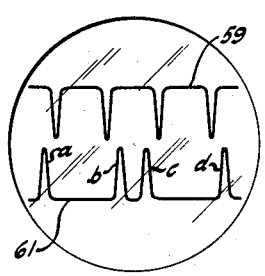
Figs. 4 and 5 illustrate the traces on an oscilloscope screen when resonance occurs in the respective samples at the same and at different phases of the variation of the magnetic field.
Figure 5:
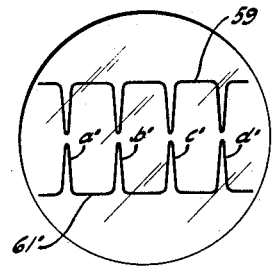

The pulses from the microwave circuit and the fluxmeter circuit are preferably so poled that they cause deflection of the oscilloscope beam in opposite directions, preferably from displaced base lines as shown in Figs. 4 and 5. Each of these figures illustrates the general position and shape of the pulses as displayed upon the face of the oscilloscope. It is assumed in this showing that the waveform of the sweep generator is sinusoidal. It will be recognized that the pulses developed by electronic resonance in the probe 25 are generated in the same manner as those of lower frequency from the fluxmeter if the latter is of the Pound type. When the sample is in resonance it absorbs energy from the cavity resonator, decreasing its Q and causing a pulse of downward modulation. This pulse is rectified by the detector and can be displayed upon the screen of the oscilloscope in either direction, depending upon the direction in which the detector is poled.

The procedure in using the device varies slightly, depending upon whether it is desired to measure or control the frequency of the generator 1. If it is to be measured it is more convenient to adjust the average value of the flux so that the pulses developed from the generator are uniformly spaced on the screen, as illustrated by the upper trace 59 of Figs. 4 and 5. Assuming that the fluxmeter is out of tune, i. e., that the frequency to which it responds differs from that of the generator 1 by a ratio differing from that of the response-ratios of the two samples, the general appearance of the trace 61 illustrating the fluxmeter pulses would be substantially as shown in Fig. 4. The pulses illustrated on the trace 59 occur as the current from the sweep generator through the coils 19, 19' passes through zero. If the fluxmeter is tuned to too high a frequence, pulses on the trace 61 will occur when the field of the sweep generator passes through some value above zero (i. e., when its field is additive with respect to the main field), causing pulses $a$ and $b$ to be widely separated, their spacing representing the longer portion of the cycle when the flux in the gap is less than that required to excite resonance, while the pulses $b$ and $c$ are separated by a shorter distance representing the smaller fraction of the cycle. The separation between pulses $c$ and $d$ is again wider.

Adjusting the frequency of response of the fluxmeter 53 results in the type of display shown in Fig. 5, decreasing the distances between pulses $a'$ and $b'$ and increasing the distance between pulses $b'$ and $c'$. Because the pulses are very sharp they can be brought into very accurate alinement. The frequency of the generator is then that indicated by the fluxmeter itself or by the frequency meter 57, multiplied by the ratio $k/K$ of the absorption lines of the two samples. If it is desired to control the frequency of the generator the fluxmeter is first set at the desired resonance frequency and the generator is adjusted to bring the phases of the cycle of flux change at which the two resonances occur into coincidence.

It should be evident that it is not necessary that the average flux be set to give resonance in either sample. If the original reading of the oscilloscope is as shown in Fig. 4 but the fluxmeter is set at the standard frequency which is to be compared with that of the generator, to permit adjustment of the latter, the generator frequency can be varied to bring the pulses developed by it into coincidence with the unequally spaced pulses of trace 61, instead of the reverse process. Equal spacing of either set of pulses is a convenience, not a necessity; all that is necessary is that the cyclic variation of the magnetic field be sufficiently great so that resonance of both samples occurs within that cycle.

It will be seen that the function of the oscilloscope in this combination is merely to permit a comparison of the phases of the magnetic sweep at which the pulses occur. This can be done whether the sweep frequency has a sine waveform, as has been assumed in the above discussion, or a sawtooth waveform. If a sawtooth sweep is used there will, in general, be only one pulse from each sample visible per cycle, the return sweep being so rapid that little energy is absorbed when resonance is passed through on the flyback and the pulse, although present, is invisible upon the oscilloscope. In this case the pulse from one sample occurs earlier or later with respect to the other depending upon whether the particular sample resonates with the tuned circuit with which it is coupled at a lower or higher frequency. In this case the visible pulses will be equally spaced on both traces and adjustment of the frequency of either the fluxmeter or the generator will advance or retard all of the pulses visible until they are brought into coincidence.

Other types of coincidence indicator can be used to serve the same purpose as the oscilloscope. For example, a phase discriminator connected to a zero-center meter will serve the purpose, although not quite so elegantly.

It should be noted that although the two samples are always coupled into resonant circuits, of either the fluxmeter or the generator, it is not necessary that the probes themselves which contain the samples be resonant. The cavity resonator 25 increases the sensitivity of this probe, but when enough power is available from the generator a non-resonant probe can be used, the elongated and flattened section 27 of the wave guide, as illustrated in Fig. 2, being extended beyond the hole 29 for receiving the sample and the wave guide being terminated in its own characteristic impedance. In this case no tuning of the probe is necessary; it is only required that the coupling for the detector circuit be mounted at the end of the probe distant from the input coupling.

Other modifications of the invention besides those mentioned will be evident to those skilled in the art. The particular form described and illustrated is therefore not intended to limit the scope of the invention, all intended limitations being specifically expressed in the following claims.

What is claimed is as follows:

1. Means for developing an electrical oscillation having a frequency of known ratio to the frequency of a second electrical oscillation, one of said oscillations having a frequency in the microwave range and the other a frequency at least two orders of magnitude lower which comprises means for establishing a cyclically varying magnetic field, means for simultaneously subjecting to said field two samples of gyomagnetically active materials, one of said materials having an electronic gyromagnetic constant such as to cause gyromagnetic resonance thereof to said microwave frequency and the other having a nuclear gyromagnetic constant such as to cause gyromagnetic resonance thereof with said lower frequency when both are within the range of variation of said magnetic field, means for exciting gyromagnetic resonance of said samples to the respective oscillations, means for detecting gyromagnetic resonance of said samples to the frequencies of said oscillations respectively, means for comparing the relative phases of the cyclic variation of said magnetic field at which resonance occurs in the respective samples, and means for varying the frequency of one of said oscillations to bring the phases of said cyclic variation at which the respective resonances occur into coincidence, whereby the frequency ratio of said oscillations is equal to the ratios of the gyromagnetic constants of said samples.

2. Means for developing an electrical oscillation having a frequency of known ratio to the frequency of a second electrical oscillation, one of said oscillations having a frequency in the microwave range and the other a frequency at least two orders of magnitude lower, which comprises means for establishing a cyclically varying magnetic field, means for simultaneously subjecting to said field two samples of gyromagnetically active materials, one of said materials having an electronic gyromagnetic constant such as to cause gyromagnetic resonance thereof to said microwave frequency and the other having a nuclear gyromagnetic constant such as to cause gyromagnetic resonance thereof with said lower frequency when both are within the range of variation of said magnetic field, means for subjecting said samples to the oscillations to which they are respectively resonant, means for detecting absorption of said oscillations by the respective samples, means for comparing the relative phases of the cyclic variation of said magnetic field at which resonance occurs in the respective samples, and means for varying the frequency of one of said oscillations to bring the phases of said cyclic variation at which the respective resonances occur into coincidence, whereby the frequency ratio of said oscillations is equal to the ratios of the gyromagnetic constants of said samples.

3. Frequency comparison apparatus for comparing an electrical oscillation with a standard of different frequency which comprises means for establishing a magnetic field varying cyclically through a relatively small percentage of its average magnitude, an oscillatory system adapted to resonate at substantially said microwave frequency including means for coupling thereto a first sample of gyromagnetically active material and positioning said sample within said magnetic field, a second oscillatory system including means for coupling thereto a second sample of gyromagnetically active material and positioning said sample in said magnetic field simultaneously with said first sample, connections for applying oscillations of said microwave frequency to excite said first oscillatory system, a detector coupled to said first oscillatory system to respond to variations in amplitude of oscillation therein resulting from the excitation of gyromagnetic resonance in said first sample, means for exciting gyromagnetic resonance in said second sample, means for detecting gyromagnetic resonance thereof at the resonant frequency of said second oscillatory system, means for comparing the phases of the cyclic variation of said magnetic field at which said first and second samples respectively are resonant, and means for tuning said second oscillatory system to bring the phases of said cyclic variation of said samples into coincidence, whereby the frequency to which said second oscillatory circuit is tuned is in the same ratio to the frequency of said oscillation as the gyromagnetic constant of said second sample to the gyromagnetic constant of said first sample.

4. Frequency comparison apparatus as defined in claim 3 for comparing a microwave frequency with a frequency standard of a lower order of magnitude wherein said first sample has an electronic gyromagnetic constant and said second sample has a nuclear gyromagnetic constant.

5. A frequency meter for microwave oscillations comprising means for establishing a cyclically varying magnetic field, a first oscillatory system adapted to be coupled to a source of oscillations of the frequency to be measure and including means for coupling thereto a first sample of material having electronic gyromagnetic resonance and positioning said sample in said magnetic field, a detector coupled to said first oscillatory system to develop a first train of unidirectional pulses at epochs of the cyclic variation of said magnetic field at which said first sample is gyromagnetically resonant to the frequency of said oscillations, a frequency standard comprising a calibrated oscillatory system tunable through a range of frequencies of a lower order of magnitude than said microwave oscillations, means for coupling to said calibrated oscillatory system a second sample of material having a nuclear gyromagnetic constant and for positioning said second sample in said magnetic field at a position of substantially equal intensity as said first sample, means for exciting gyromagnetic resonance in said second sample with the frequency of said calibrated oscillatory system within the range of cyclic variation of said magnetic field, detector means for producing a second train of unidirectional pulses when said second sample is so resonant, and means for comparing the relative phases of said cyclic variation of magnetic field at which said first and second trains of unidirectional pulses occur.

6. A frequency meter for microwave oscillations comprising means for establishing a cyclically varying magnetic field, a first oscillatory system adapted to be coupled to a source of oscillations of the frequency to be measured and including means for coupling thereto a first sample of material having electronic gyromagnetic resonance and positioning said sample in said magnetic field, a detector coupled to said first oscillatory system to develop a first train of unidirectional pulses at epochs of the cyclic variation of said magnetic field at which said first sample is gyromagnetically resonant to the frequency of said oscillations, a frequency standard comprising a calibrated oscillatory system tunable through a range of frequencies of a lower order of magnitude than said microwave oscillations, means for coupling to said calibrated oscillatory system a second sample of material having a nuclear gyromagnetic constant and for positioning said second sample in said magnetic field at a position of substantially equal intensity as said first sample, means for exciting gyromagnetic resonance in said second sample with the frequency of said calibrated oscillatory system within the range of cyclic variation of said magnetic field, detector means for producing a second train of unidirectional pulses when said second sample is so resonant, an oscilloscope, and connections for displaying on said oscilloscope traces representative of said first and second trains of pulses in juxtaposition, said traces being synchronized with the cyclic variation of said magnetic field so as to show the relative phases of said variation at which the respective trains of pulses occur.

7. A frequency meter for microwave oscillations comprising means for establishing a cyclically varying magnetic field, a first oscillatory system adapted to be coupled to a source of oscillations of the frequency to be measured and including means for coupling thereto a first sample of material having electronic gyromagnetic resonance and positioning said sample in said magnetic field, a detector coupled to said first oscillatory system to develop a first train of unidirectional pulses at epochs of the cyclic variation of said magnetic field at which said first sample is gyromagnetically resonant to the frequency of said oscillations, a frequency standard comprising a calibrated oscillator tunable through a range of frequencies of a lower order of magnitude than said microwave oscillation, means for coupling to said oscillator a second sample of material having a nuclear gyromagnetic constant and for positioning said second sample in said magnetic field at a position of substantially equal intensity as said first sample, a detector coupled to said oscillator to develop a second train of unidirectional pulses at the epochs of the cyclic variation of said magnetic field at which said second sample is gyromagnetically resonant to the frequency of said oscillator, and means for comparing the relative phases of said cyclic variation of magnetic field at which said first and second trains of unidirectional pulses occur.

8. A frequency meter for microwave oscillations comprising means for establishing a cyclically varying magnetic field, a first oscillatory system adapted to be coupled to a source of oscillations of the frequency to be measured and including means for coupling thereto a first sample of material having electronic gyromagnetic resonance and positioning said sample in said magnetic field, a detector coupled to said first oscillatory system to develop a first train of unidirectional pulses at epochs of the cyclic variation of said magnetic field at which said first sample is gyromagnetically resonant to the frequency of said oscillations, a frequency standard comprising a calibrated oscillator tunable through a range of frequencies of a lower order of magnitude than said microwave oscillations, means for coupling to said oscillator a second sample of material having a nuclear gyromagnetic constant and for positioning said second sample in said magnetic field at a position of substantially equal intensity as said first sample, a detector coupled to said oscillator to develop a second train of unidirectional pulses at the epochs of the cyclic variation of said magnetic field at which said second sample is gyromagnetically resonant to the frequency of said oscillator, an oscilloscope, and connections for displaying on said oscilloscope traces representative of said first and second trains of pulses in juxtaposition, said traces being synchronized with the cyclic variation of said magnetic field so as to show the relative phases of said variation at which the respective trains of pulses occur.

9. The method of employing two materials having different gyromagnetic constants to establish an accurately determinable ratio of a relatively high frequency oscillation to the frequency of a standard of a lower order of magnitude which comprises the steps of subjecting samples of both of said materials to a magnetic field varying cyclically through a range within which one of said samples is resonant to said high frequency oscillation and the other is resonant to the frequency of said standard oscillation, whereby two trains of pulses occurring respectively at epochs of the cyclic variation of said field at which such resonance occurs are developed, comparing the epochs of occurrence of the respective trains of pulses, and varying the frequency of one of said oscillations to bring the epochs of occurrence of the respective trains of pulses into coincidence.

References Cited in the file of this patent

UNITED STATES PATENTS

| | | |
|---|---|---|
| 2,561,490 | Varian | July 24, 1951 |
| 2,589,494 | Hershberger | Mar. 18, 1952 |